(12) United States Patent
Takeda et al.

(10) Patent No.: US 8,077,286 B2
(45) Date of Patent: Dec. 13, 2011

(54) LIQUID CRYSTAL DISPLAY DEVICE

(75) Inventors: Arihiro Takeda, Saitama (JP); Nobuko Fukuoka, Saitama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 101 days.

(21) Appl. No.: 12/186,438

(22) Filed: Aug. 5, 2008

(65) Prior Publication Data
US 2009/0073371 A1    Mar. 19, 2009

(30) Foreign Application Priority Data

Aug. 10, 2007  (JP) ................................ 2007-210078
Feb. 28, 2008  (JP) .................................. 2008-48673

(51) Int. Cl.
*G02F 1/1339* (2006.01)
(52) U.S. Cl. .......... 349/156; 349/39; 349/106; 349/110; 349/153; 349/157
(58) Field of Classification Search ................. 349/37, 349/38, 155, 156, 157, 39, 106, 129, 153, 349/110
See application file for complete search history.

(56) References Cited

U.S. PATENT DOCUMENTS

| | | | | |
|---|---|---|---|---|
| 6,067,144 | A * | 5/2000 | Murouchi ...................... | 349/156 |
| 6,433,852 | B1 * | 8/2002 | Sonoda et al. ................ | 349/156 |
| 6,580,226 | B1 | 6/2003 | Manabe et al. | |
| 7,133,108 | B2 | 11/2006 | Shimizu et al. | |
| 2001/0040665 | A1 | 11/2001 | Ahn | |
| 2002/0060764 | A1 * | 5/2002 | Taniguchi et al. ............ | 349/130 |
| 2002/0093617 | A1 * | 7/2002 | Matsuyama et al. .......... | 349/156 |
| 2003/0151716 | A1 * | 8/2003 | Yanagawa et al. ............ | 349/155 |
| 2004/0114087 | A1 * | 6/2004 | Cho et al. ...................... | 349/155 |
| 2004/0257519 | A1 * | 12/2004 | Jun et al. ....................... | 349/155 |
| 2007/0002263 | A1 * | 1/2007 | Kim et al. ..................... | 349/156 |

FOREIGN PATENT DOCUMENTS

| | | |
|---|---|---|
| JP | 3680730 | 5/2005 |
| KR | 2001-0051567 | 6/2001 |
| KR | 2001-0084454 | 9/2001 |

OTHER PUBLICATIONS

Official Communication from Korean Patent Office, dated May 13, 2010, issued in counterpart KR Application No. 2008-0077920 5 pages).
Official Communication from Korean Patent Office, dated Oct. 7, 2010, issued in counterpart KR Application No. 2008-0077920 (3 pages).
Official Communication from Korean Patent Office, dated Dec. 14, 2010, issued in counterpart KR Application No. 10-2008-077920 (2 pages).

* cited by examiner

*Primary Examiner* — David Nelms
*Assistant Examiner* — Tai Duong
(74) *Attorney, Agent, or Firm* — Finnegan, Henderson, Farabow, Garrett & Dunner, L.L.P.

(57) ABSTRACT

On an opposite substrate, such a protrusion that is not contact with an array substrate is disposed. Alternatively, on the array substrate, such a protrusion that is not contact with the opposite substrate is formed of the same material as a spacer. Still alternatively, a large wall-like spacer is disposed on the array substrate. This reduces an amount of liquid crystal sandwiched by the substrates, and thus suppresses generation of low-temperature bubbles in the liquid crystal.

5 Claims, 7 Drawing Sheets

LIQUID CRYSTAL DISPLAY DEVICE

CROSS-REFERENCE TO RELATED APPLICATIONS

This application is based upon and claims the benefit of priority from Japanese Patent Applications No. 2007-210078 filed on Aug. 10, 2007; and No. 2008-048673 filed on Feb. 28, 2008, the entire contents of which are incorporated herein by reference.

BACKGROUND OF THE INVENTION

1. Field of the Invention

The present invention relates to a liquid crystal display device, particularly to a liquid crystal display device in which a protrusion to serve as a spacer is formed on a substrate.

2. Description of the Related Art

In a general-type liquid crystal display device, liquid crystal is sandwiched by two glass substrates on which electrodes are formed, and the two substrates are fixed together with an adhesive agent. Moreover, in an active matrix liquid crystal display device, which is capable of color display, multiple signal lines and multiple scanning lines are disposed on one of the substrates, which is an array substrate, in a manner that each signal line crosses the scanning lines. On the intersections of these lines, pixel electrodes and thin-film transistors (TFTs) each including a semiconductor layer made of amorphous silicon (a-Si) are disposed, respectively. On the other substrate, which is an opposite substrate, an opposite electrode and color filters are formed. In addition, on both outer sides of the two substrates, polarizing plates, which function as an optical shutter, are disposed.

In addition, plastic beads with the same particle size are interspersed between the two substrates such that a distance (cell gap) between the substrates can be kept constant. Recently, a method is also being used in which protrusions (spacers) are formed on the substrates such that the cell gap can be kept constant. Since the spacers can be disposed selectively in any positions, and have high height accuracy, they are effective at uniforming the cell gap. More recently, as a measure against an external load temporarily applied on a liquid crystal display device, disclosed is a technique of providing, as auxiliary spacers, one of the substrates with columnar protrusions which are not in contact with the opposite one of the substrates under normal conditions (refer to Japanese Patent No. 3680730, for example).

However, when an external impact is applied on a conventional liquid crystal display device in a low-temperature environment, air bubbles may possibly be generated in a liquid crystal layer therein. The linear expansion coefficient of liquid crystal is larger than those of spacers and substrates. Accordingly, at a low temperature, a contraction rate of the liquid crystal is significantly different from those of the spacers and the substrates. Thus, when an external impact is applied on a conventional liquid crystal display device at a negative pressure in a low-temperature environment, the liquid crystal cannot contract along with the contraction of the spacers and the substrates in the liquid crystal display device. As a result, air bubbles are generated in the liquid crystal, which causes a problem that display quality of the conventional liquid crystal display device is seriously deteriorated.

To address this problem, methods for suppressing generation of such low-temperature bubbles have been proposed. In one of these methods, disposition density of spacers is reduced so that the substrates can be more flexible. However, with too reduced disposition density, spacers will not exert their principle function, and thus liquid crystal cells are likely to be narrowed locally or generally. Accordingly, the method has a problem of causing cell gap defects and defects in optical characteristics in a liquid crystal display device, and thus deteriorating display quality of the liquid crystal display device. Meanwhile, as another effective method for suppressing generation of low-temperature bubbles, there is a method of increasing a liquid crystal amount to be injected into a liquid crystal cell in order to reduce a negative pressure generated when the liquid crystal contracts in a low-temperature environment, in other words, a method of injecting a large amount of liquid crystal into a liquid crystal cell by applying a pressure thereon. However, too large amount of liquid crystal will make a cell gap nonuniform in a display. Accordingly, the method has a problem of causing display defects of a liquid crystal display device, and thus deteriorating display quality thereof.

SUMMARY OF THE INVENTION

An object of the present invention is to suppress generation of low-temperature bubbles in a liquid crystal display device while maintaining high display quality thereof.

A liquid crystal display device according to the present invention includes an array substrate, an opposite substrate, a liquid crystal layer and a wall-shaped structure. On the array substrate, a plurality of pixel electrodes are disposed in a matrix. The opposite substrate is disposed opposite the array substrate. The liquid crystal layer is sandwiched by the two substrates. The wall-shaped structure is disposed on a side, adjacent to the liquid crystal layer, of any one of the array substrate and the opposite substrate, and extends parallel to a substrate surface of the one of the substrates.

The liquid crystal display device according to the present invention includes the wall-shaped structure disposed on a side, adjacent to the liquid crystal layer, of any one of the substrates, and extending parallel to a substrate surface of the one of the substrates. This reduces, in amount, the liquid crystal which has a low external-shock resistance while increasing, in volume, the members which have a high shock resistance. Accordingly, the liquid crystal display device according to the present invention can suppress generation of low-temperature bubbles therein.

DESCRIPTION OF THE EMBODIMENT

First Embodiment

Figure 1:
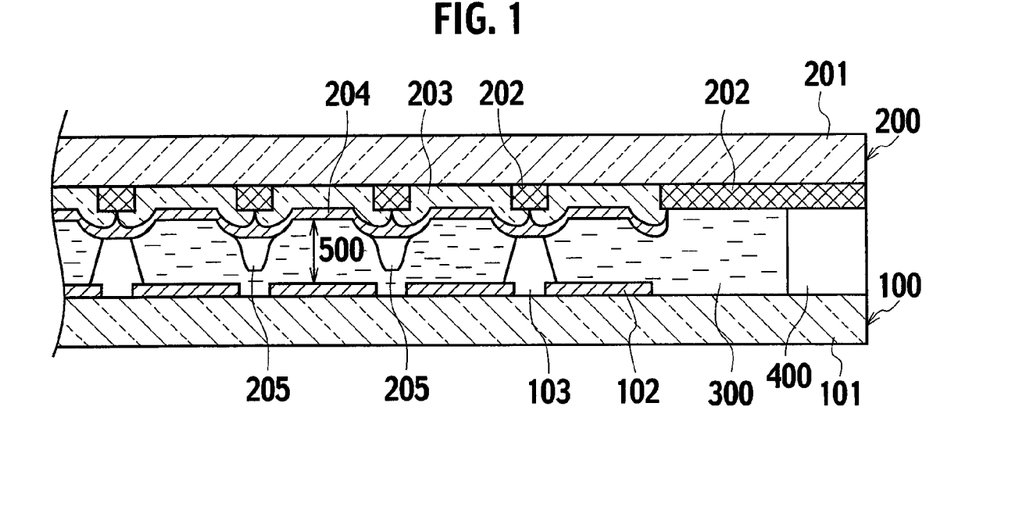
FIG. 1 is a schematic cross-sectional view of a liquid crystal display device according to a first embodiment.

As shown in FIG. 1, a liquid crystal display device according to a first embodiment includes an array substrate 100, an opposite substrate 200, a liquid crystal layer 300 and spacers 103. The opposite substrate 200 is disposed opposite the array substrate 100, and the liquid crystal layer 300 is sandwiched by these substrates. The spacers 103 are disposed on the array substrate 100 so as to keep a gap between the substrates constant. On both outer sides of the two substrates 100 and 200, polarizing plates (not shown) are disposed. On the back side of the array substrate 100, a backlight (not shown) is disposed. The liquid crystal display device is a transmissive liquid crystal display device which displays images by using illumination light from the backlight as a light source.

The two substrates 100 and 200 are bonded together by a one drop fill method in the following steps. Firstly, a continuous line of an adhesive agent 400 is disposed on one of the substrates so as to surround a display region. Then, a predetermined amount of a liquid crystal is dropped into the region surrounded by the adhesive agent 400. Then, the two substrates are bonded together under vacuum. Thereafter, the pressure is increased from vacuum to normal atmospheric pressure, so that a pressure difference between a region surrounded by the substrates and an inner wall of the adhesive agent 400 and its outside region flattens the adhesive agent 400. The two substrates are supported by the spacers 103, and thus a predetermined cell gap 500 is formed between the substrates.

Figure 2:
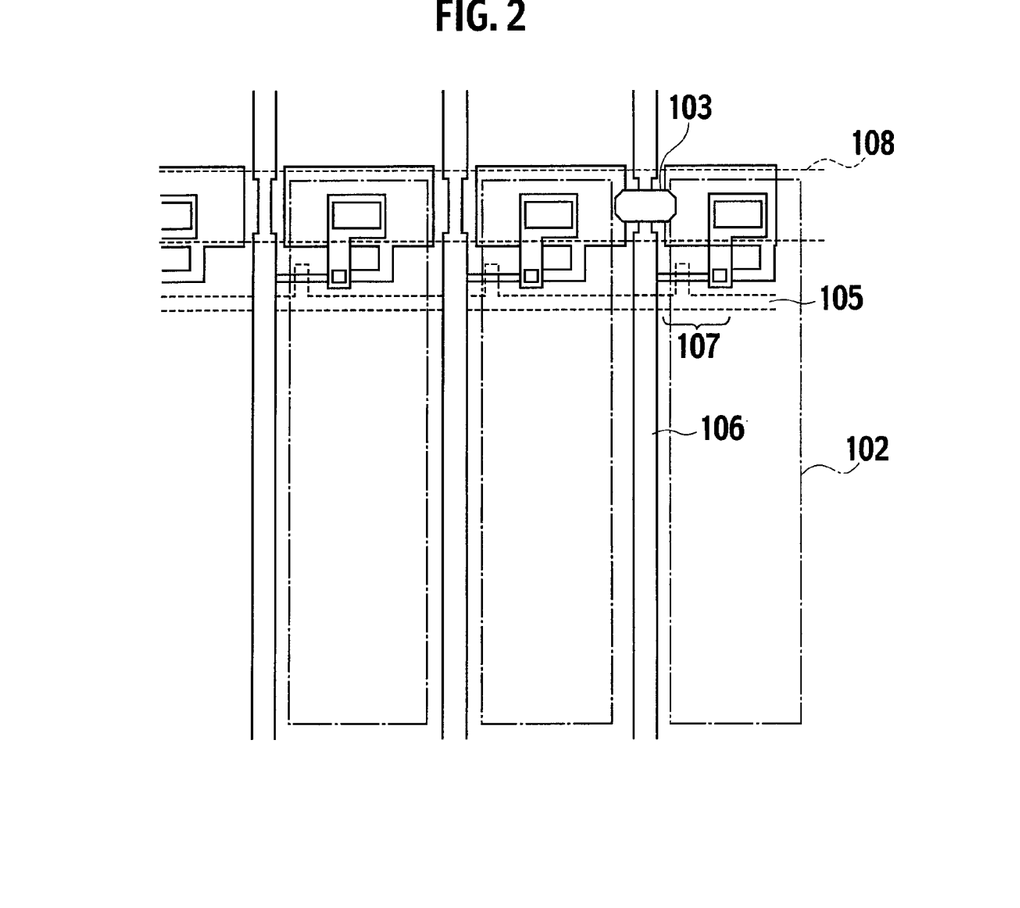
FIG. 2 is a plan view schematically showing a configuration on an array substrate in the liquid crystal display device.

In the array substrate 100, an insulating layer (not shown) is formed on a glass substrate 101, and transparent pixel electrodes 102 are formed on the insulating layer. The pixel electrodes 102 are arranged in a matrix. As shown in a plan view of FIG. 2, multiple signal lines 106 and multiple scanning lines 105 are disposed in a manner that each signal line 106 crosses the scanning lines 105. On the intersections of these lines, the pixel electrodes 102 and TFTs 107 are disposed, respectively. Moreover, storage capacitor lines 108 are disposed parallel to the scanning lines 105. On the storage capacitor lines 108, the spacers 103 are disposed. The spacers 103, which are protrusions formed by photolithography, are columns made of a transparent resin and having the same height. As TFTs 107, TFTs each including a semiconductor layer made of amorphous silicon (a-Si) is used. Drain terminals of the TFTs 107 are connected to the signal lines 106, source terminals of the TFTs 107 are connected to the pixel electrodes 102, and gate terminals of the TFTs 107 are connected to the scanning lines 105.

In the opposite substrate 200, on the side, adjacent to the liquid crystal layer 300, of a glass substrate 201, colored layers 203 of color filters are formed in positions corresponding to the pixel electrodes 102. Additionally, a light-shielding layer 202 for shielding light in gaps each of which lies between each adjacent two colored layers 203 is also formed on that side of the glass substrate 201. The colored layers 203 are formed so as not to overlap with each other, thereby preventing different colors thereof from being mixed. In addition, an overcoat layer (not shown) is formed so as to cover the colored layers 203 and the light-shielding layer 202, in order to smooth the surface, and on the overcoat layer, an opposite electrode 204 is formed. On the opposite electrode 204, protrusions 205 are disposed so as not to be in contact with the array substrate 100. The protrusions 205 are made of a dielectric material.

Figure 3:
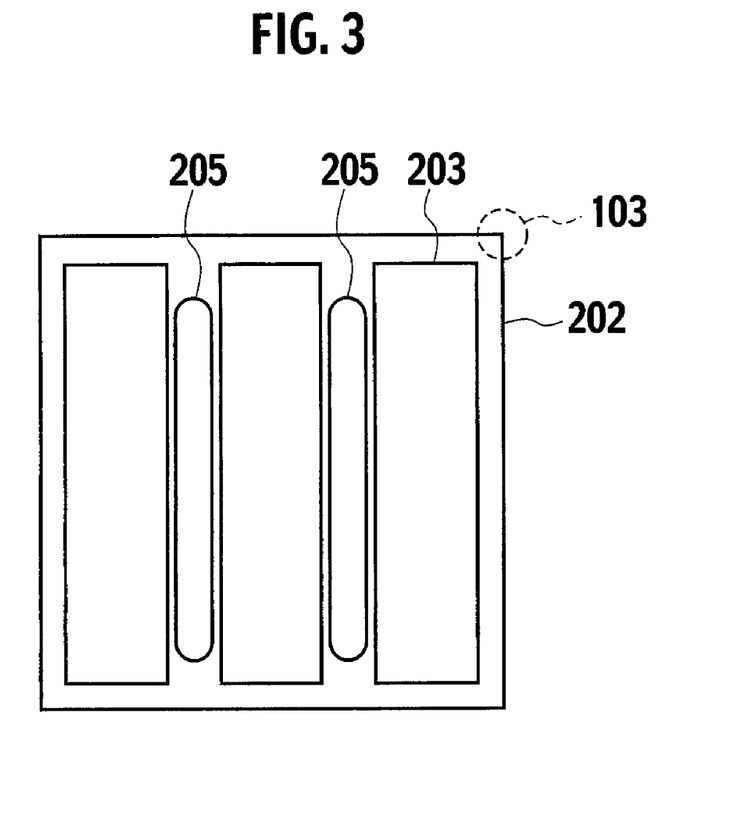
FIG. 3 is a plan view schematically showing a configuration on an opposite substrate in the liquid crystal display device.
Figure 4:
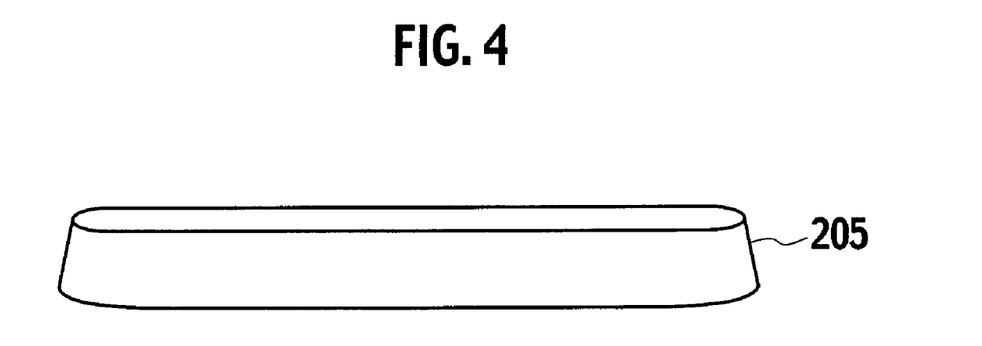
FIG. 4 shows a form of each protrusion on the opposite substrate in the liquid crystal display device.

As shown in a plan view of FIG. 3, the protrusions 205 are formed on the light-shielding layer 202 along the colored layers 203 of the color filters having three colors, red, green, and blue. Moreover, as shown in FIG. 4, each protrusion 205 is shaped like a wall having a predetermined length in a direction parallel to the substrate surface of the opposite substrate. Since the protrusions 205 are disposed in such positions that will not affect displayed images, such as light-shielding regions on the wires including the signal lines, an aperture ratio of pixels of the liquid crystal display device are prevented from being reduced.

With this configuration, the liquid crystal, which has a low shock resistance in a low-temperature environment, is reduced in amount while the protrusions 205, which have a high shock resistance, are increased in volume. Thus, this configuration can suppress generation of low-temperature bubbles. Moreover, in general, increased disposition density of spacers makes substrates less flexible, and thus increases probability of air bubble generation. By contrast, the protrusions 205 are not in contact with the array substrate 100, so that none of them functions as a spacer. Accordingly, the disposition of the protrusions 205 does not change disposition density of the spacers.

The present inventor made the liquid crystal display device of this embodiment, and tested the effect of the liquid crystal display device. As a result, even when an external impact was applied on the liquid crystal display device at an environmental temperature of 0° C., no low-temperature bubble was generated therein. Note that "low temperature" in the embodiments indicates a temperature not higher than 0° C.

As described above, according to the first embodiment, on the opposite substrate 200, protrusions 205 are disposed so as not to be in contact with the array substrate 100. This lowers a proportion of the liquid crystal layer 300, which has a higher expansion coefficient than the spacers 103, to the entire liquid crystal display device, and thereby enables the liquid crystal layer 300 to contract along with the contraction of the spacers 103 in a low-temperature environment. Thus, the present invention prevents low-temperature bubbles from being generated in the liquid crystal. In other words, generation of low-temperature bubbles is suppressed since the present invention reduces, in amount, the liquid crystal which has a low shock resistance in a low-temperature environment while increasing, in volume, the protrusions 205 which have a high shock resistance. Moreover, if disposition density of the spacers 103 is increased, probability of air bubble generation is increased. However, the protrusions 205 are not in contact with the array substrate 100 opposite thereto, so that none of the protrusions 205 functions as a spacer. Accordingly, the disposition of the protrusions 205 does not change disposition density of the spacers.

Incidentally, as a liquid crystal display device in which a structure made of a dielectric material is formed in each of pixels, a semi-transmissive liquid crystal display device is known. The semi-transmissive liquid crystal display device includes reflective regions and transmissive regions. In each transmissive region, a light beam incident on a surface of one substrate transmits to a surface of the other substrate. Meanwhile, in each reflective region, a light beam incident on a surface of one substrate is reflected by a reflective electrode disposed on the other substrate. In order to adjust color strength in the reflective regions to be approximately the same as that in the transmissive regions, one of the substrates is made uneven such that levels in the reflective regions are made higher with a dielectric material (multi gap structure). This unevenness reduces an aperture ratio in the transmissive regions.

By contrast, the liquid crystal display device according to the first embodiment is a transmissive type liquid crystal display device including only transmissive regions. In this liquid crystal display device, the protrusions 205 that can prevent light transmission are disposed on the light-shielding layer 202, and thus this liquid crystal display device can suppress reduction of the aperture ratio of pixels.

Second Embodiment

Hereinafter, description will be given of a liquid crystal display device according to a second embodiment. A fundamental configuration of this liquid crystal display device is similar to that described in the first embodiment. Accordingly, the following description will focus on differences from the first embodiment.

Figure 5:
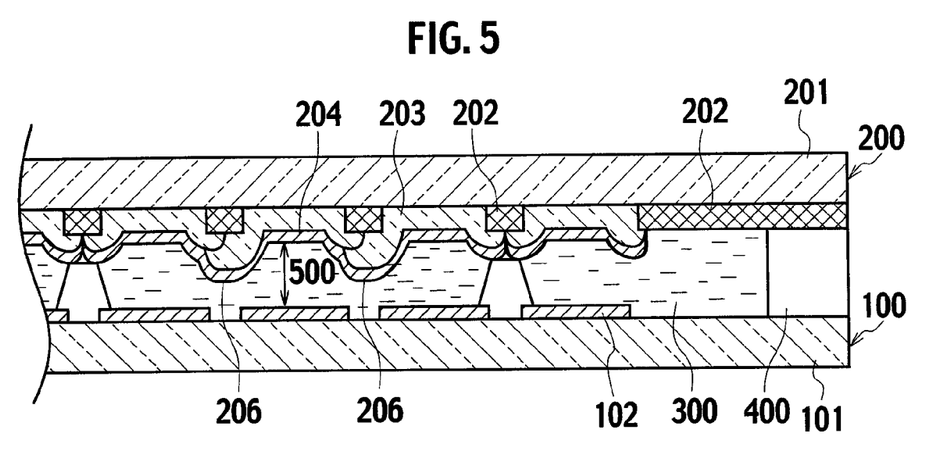
FIG. 5 is a schematic cross-sectional view of a liquid crystal display device according to a second embodiment.
Figure 6:
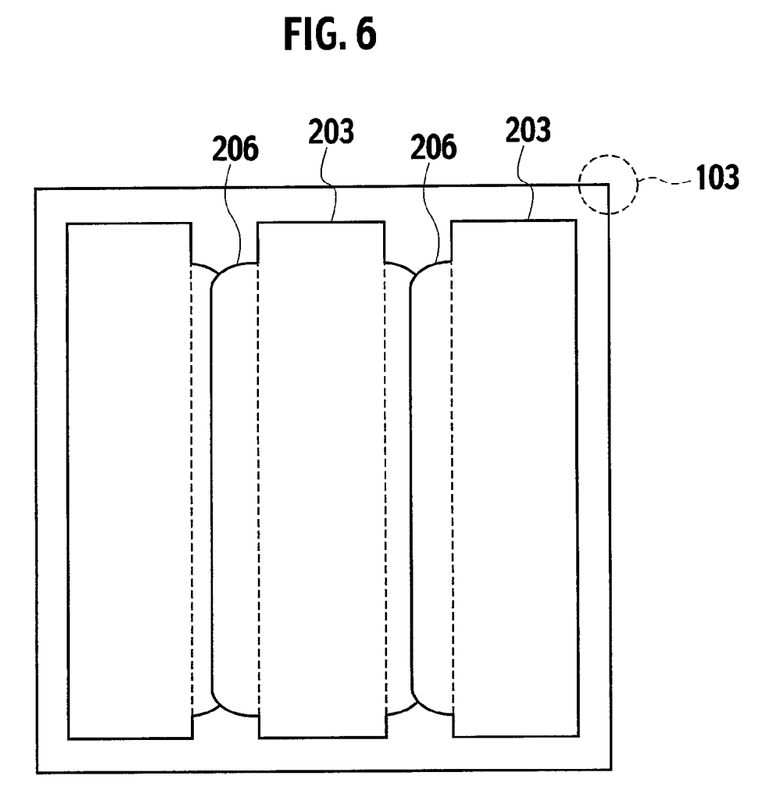
FIG. 6 is a plan view schematically showing a configuration on an opposite substrate in the liquid crystal display device.

As shown in a cross-sectional view of FIG. 5, on the light-shielding layer 202, some adjacent two colored layers 203 are partially stacked on each other, and thereby protruding multilayer parts 206 are formed in place of protrusions of a dielectric material. In the first embodiment, the colored layers 203 are disposed so as not to overlap with each other, so that different colors thereof can be prevented from being mixed. By contrast, in this embodiment, some adjacent two colored layers 203 of two colors are intentionally stacked partially on each other, and thereby the protruding multilayer parts 206 are formed, as shown in FIG. 6.

The present inventor made the liquid crystal display device of this embodiment, and tested the effect of the liquid crystal display device. As a result, even when an external impact was applied on the liquid crystal display device at an environmental temperature of 0° C., no low-temperature bubble was generated therein.

As described above, according to the second embodiment, some adjacent two colored layers 203 are partially stacked on each other on the light-shielding layer 202, and thereby the protruding multilayer parts 206 are formed. Thus, it is possible to form the protruding multilayer parts 206 by only adjusting thicknesses of the colored layers in manufacturing the liquid crystal display device, and thus to reduce the manufacturing cost thereof. Of course, the multilayer parts 206 are also expected to bring the effects according to the first embodiment.

Third Embodiment

Hereinafter, description will be given of a liquid crystal display device according to a third embodiment. A fundamental configuration of this liquid crystal display device is similar to that described in the first embodiment. Accordingly, the following description will focus on differences from the first embodiment.

Figure 7:
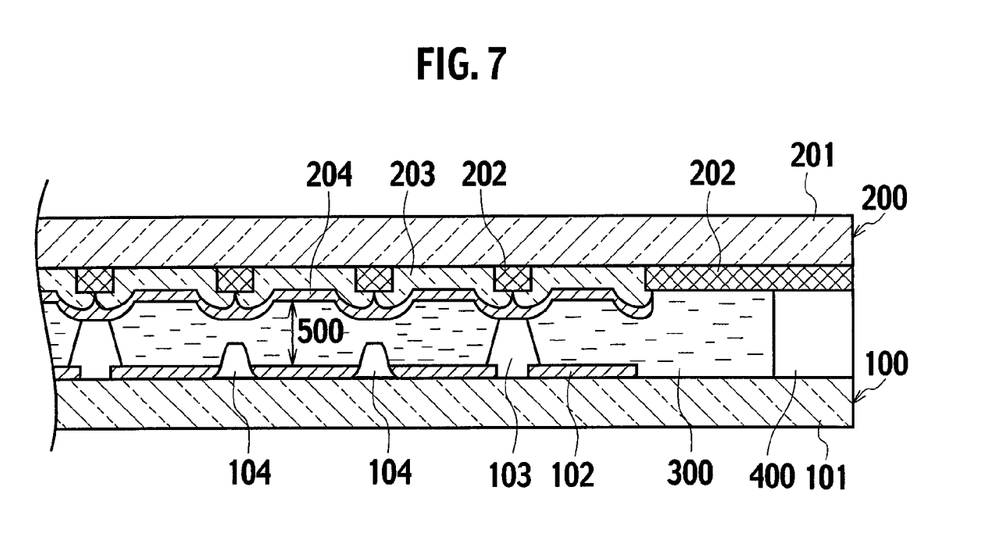
FIG. 7 is a schematic cross-sectional view of a liquid crystal display device according to a third embodiment.
Figure 8:
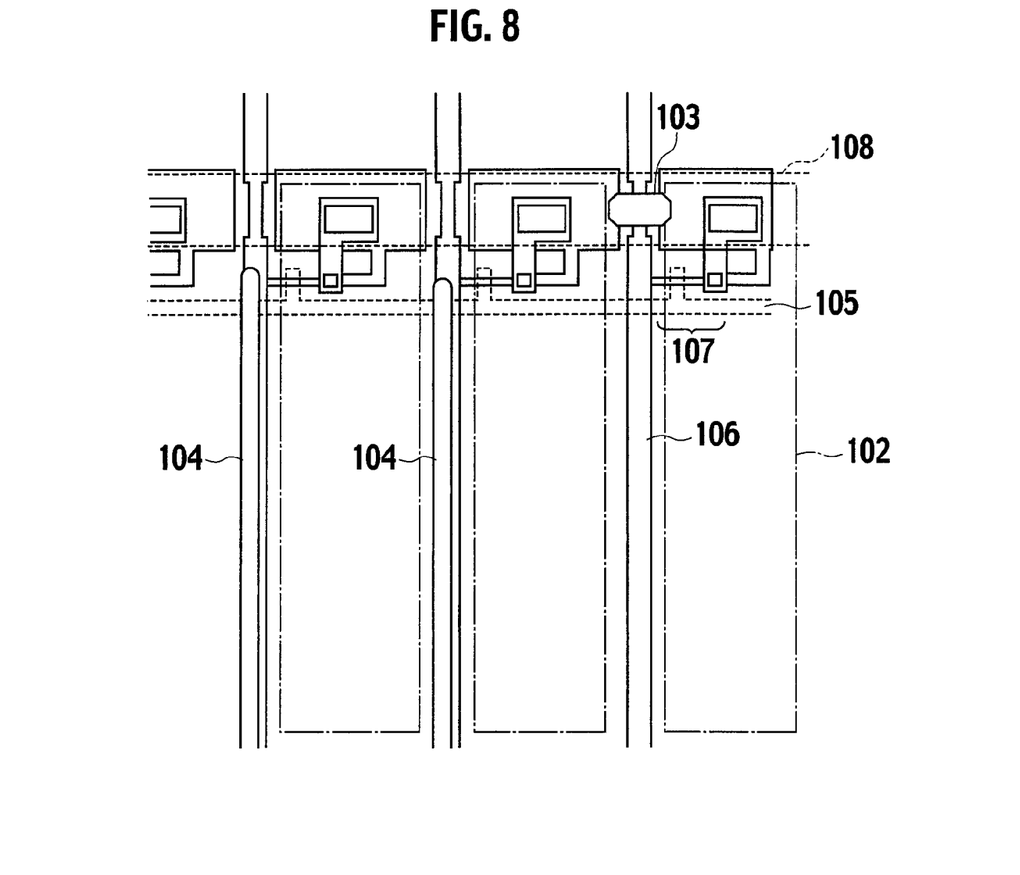
FIG. 8 is a plan view schematically showing a configuration on an array substrate in the liquid crystal display device.

As shown in FIG. 7, in this embodiment, protrusions 104 are disposed on the array substrate 100 instead of the opposite substrate 200, as similar to the spacers 103. Moreover, as shown in FIG. 8, the protrusions 104 made of the same transparent resin as the spacers 103 are formed in positions corresponding to the signal lines 106. On the signal lines 106, fewer films are stacked than on the positions of the spacers 103, so that the protrusions 104 are configured not to be in contact with the opposite substrate 200. Moreover, since the protrusions 104 are disposed on the signal lines 106, the aperture ratio of pixels is not reduced. Note that the protrusions 104 may be disposed on the scanning lines 105.

The present inventor made the liquid crystal display device of this embodiment, and tested the effect of the liquid crystal display device. As a result, even when an external impact was applied on the liquid crystal display device at an environmental temperature of 0° C., no low-temperature bubble was generated therein.

As described above, according to the third embodiment, the protrusions 104 made of the same material as the spacers are formed protruding from the array substrate. Thus, it is possible to form the protrusions 104 by only adjusting thicknesses of the spacers in manufacturing the liquid crystal display device, and thus to reduce the manufacturing cost thereof. Of course, the protrusions 104 are also expected to bring the effects according to the first embodiment.

The protrusions 104 and the spacers 103 disposed on the opposite substrate 200 instead of the array substrate 100 also have the same effects as this embodiment.

Fourth Embodiment

Hereinafter, description will be given of a liquid crystal display device according to a fourth embodiment. A fundamental configuration of this liquid crystal display device is similar to that described in the first embodiment. Accordingly, the following description will focus on differences from the first embodiment.

Figure 9:
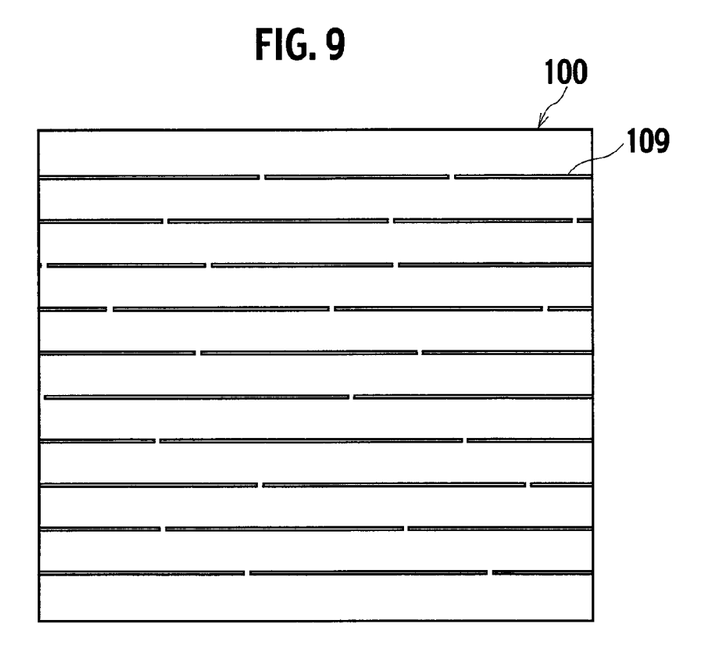
FIG. 9 is a schematic plan view of a configuration of spacers disposed on an array substrate in a liquid crystal display device according to a fourth embodiment.
Figure 10:
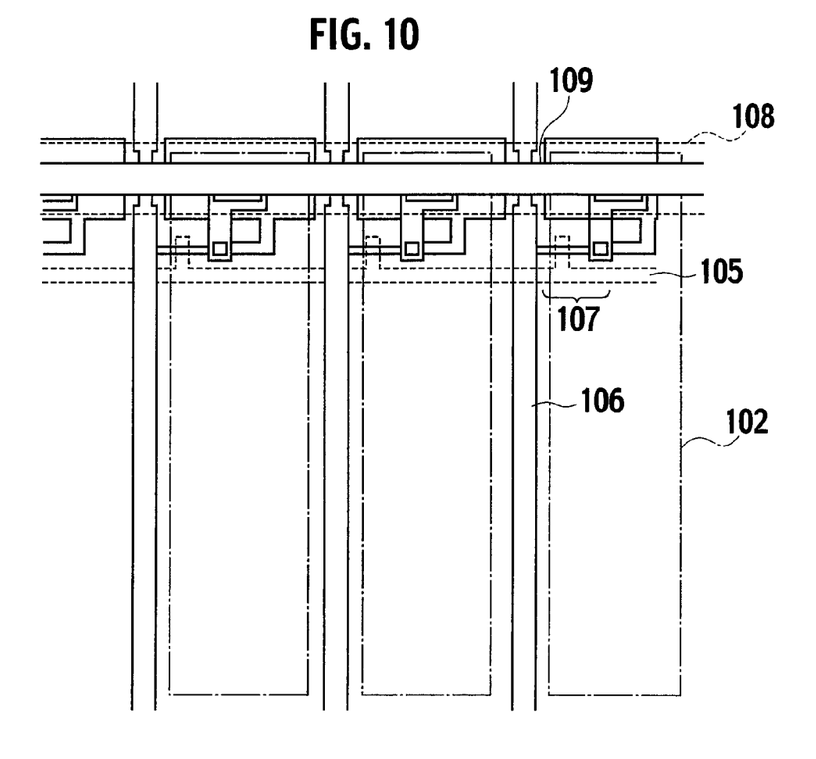
FIG. 10 is a plan view schematically showing a configuration on the array substrate in the liquid crystal display device.

In the fourth embodiment, wall-shaped spacers 109 are disposed in place of the columnar spacers 103. The spacers 109 shown in FIGS. 9 and 10, each of which is continuously formed of a transparent resin, have the same height, and are disposed like walls along the storage capacitor lines 108. Moreover, as shown in FIG. 9, gaps are provided in places in the wall-shaped spacers 109 such that the injected liquid crystal can spread throughout a liquid crystal cell of the liquid crystal display device. Unlike the protrusions 104 of the third embodiment, the height of the spacers 109 is the same as the gap length between the two substrates such that the spacers 109 can support the two substrates. As described above, the wall-shaped spacers 109, each of which is larger in volume than a conventional columnar spacer, are employed in this embodiment. Accordingly, a large volume, corresponding to the total volume of the spacers 109, of liquid crystal is reduced in a liquid crystal cell of the liquid crystal display device.

Note that, though the spacers 109 are disposed on the storage capacitor lines 108 each having a large width, the spacers 109 may be disposed on the scanning lines 105 or the signal lines 106. Moreover, the spacers 109 may be formed on the light-shielding layer 202 on the opposite substrate 200.

As described above, according to the fourth embodiment, since the wall-shaped spacers 109 are disposed in the liquid crystal cell, the liquid crystal amount therein is significantly reduced. Accordingly, though the employment of the wall-shaped spacers increases disposition density of spacers and thus makes the substrates less flexible than in the case where columnar spacers are employed, the significant reduction of the liquid crystal amount makes smaller a pressure change in the liquid crystal in a low-temperature environment. Thus, defects due to air bubbles can be prevented. In addition, the thus-achieved increase in spacer density makes gap fluctuation of the liquid crystal display device less likely to occur when a pressure is generally or locally applied thereto, and thus can prevent display defects and defects in optical characteristics.

Moreover, the spacers 109 are disposed on the storage capacitor lines 108, each of which is larger in area than each of the scanning lines 105 and the signal lines 106. This allows the spacers 109, which are larger in size, to be disposed while suppressing reduction in the aperture ratio of pixels.

Furthermore, the gaps are provided in places in the wall-shaped spacers 109. This allows the injected liquid crystal to spread throughout the liquid crystal cell.

Next, description will be given of a relationship between an amount of liquid crystal in a liquid crystal cell and pressure change in the liquid crystal.

Figure 11:
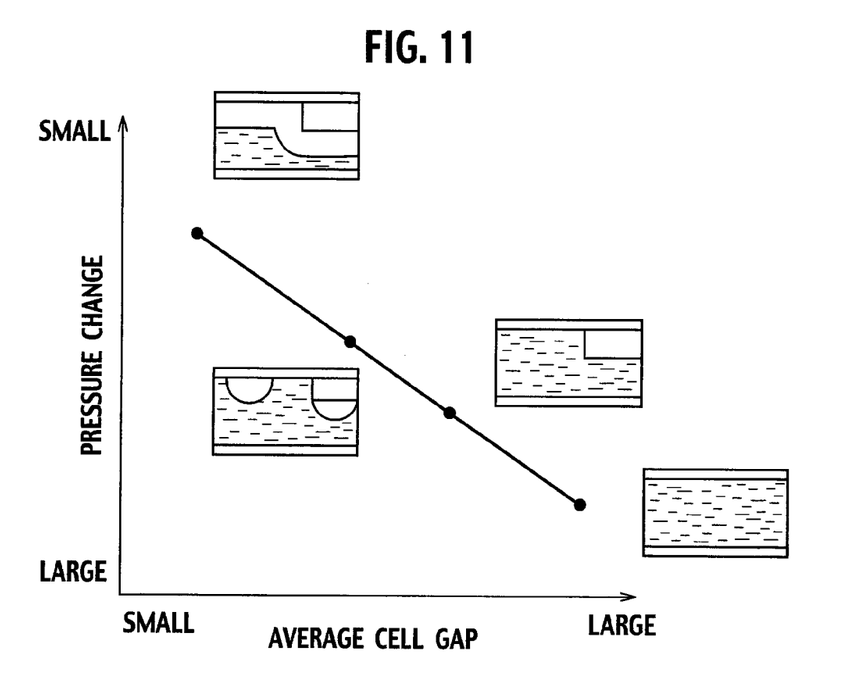
FIG. 11 is a graph showing a relationship between an average cell gap and a pressure change in liquid crystal.

In a graph of FIG. 11, the lateral axis indicates an average cell gap and the longitudinal axis indicates a pressure change in the liquid crystal.

Here, the average cell gap is an average value, which is a quotient of a cubic capacity of the liquid crystal layer by a cell area of the liquid crystal cell, where actual cell gap lengths and the area of the liquid crystal cell are set constant. In other words, the average cell gap is an effective cell gap, and is proportional to a percentage of the liquid crystal occupying the liquid crystal cell to a cubic capacity of the liquid crystal cell. Accordingly, the more the structures are in the liquid crystal layer, the smaller the liquid crystal layer is in cubic capacity, and thus the smaller the average cell gap is.

Here, a different volume of structures are disposed in the liquid crystal cell and thereby the average cell gap is changed. In the graph of FIG. 11, the average cell gap becomes larger from the left to the right, and the pressure change in the liquid crystal becomes smaller toward the top of the graph. As FIG. 11 shows, the pressure change in the liquid crystal becomes reduced as the average cell gap becomes smaller.

Figure 12:
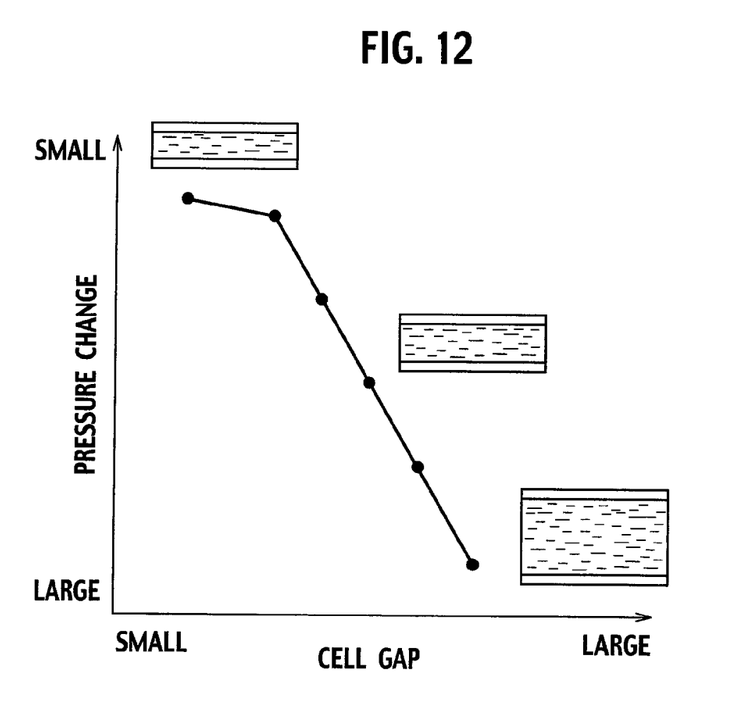
FIG. 12 is a graph showing a relationship between a cell gap and a pressure change in liquid crystal.

In a graph of FIG. 12, the lateral axis indicates a cell gap and the longitudinal axis indicates a pressure change in the liquid crystal. Moreover, the cell gap becomes larger from the left to the right of the graph, and the pressure change in the liquid crystal becomes smaller toward the top of the graph. As FIG. 12 shows, the pressure change in the liquid crystal becomes reduced as the cell gap becomes smaller.

As these graphs show, the pressure change in the liquid crystal becomes reduced as the average cell gap and the cell gap become smaller. This phenomenon is understood as follows.

It is assumed that an average value $g^*$ of reduction of the cell gaps attributable to deformation of the substrates is proportional to a pressure change $\Delta P$ in the liquid crystal, and the proportionality coefficient of the relation is set as $\beta$ ($g^* = \beta \Delta P$). A cell gap $g$ and a pressure change $\Delta P$ of the liquid crystal after a drop in temperature are obtained using the following formula:

$$g \simeq g_0 \frac{A[B(K + \rho E) + (\beta/g_0)\rho EK]}{KA + \rho EB + (\beta/g_0)\rho EK}$$

$$\Delta P \simeq \frac{\rho EK(B - A)}{KA + \rho EB + (\beta/g_0)\rho EK}$$

Here, E is Young's modulus of a material of the spacers, K is modulus of volume elasticity, $\rho$ is an area density of the spacers, $g_0$ is an initial cell-gap length, A is a coefficient determined according to a linear expansion coefficient and a temperature change value of the spacers, and B is a coefficient determined according to a linear expansion coefficient and a temperature change value of the liquid crystal. The absolute value of the pressure change $\Delta P$ in the liquid crystal is reduced as the third term $(\beta/g_0)\rho EK$ in the denominator increases. The value $\beta$, which indicates an effect of deformation of the substrates, is a constant value determined according to Young's modulus of the substrates and a distance between the spacers, and thus does not depend on the initial cell-gap length $g_0$. This means that the absolute value of the pressure change $\Delta P$ in the liquid crystal becomes smaller as $g_0$ becomes smaller. In other words, the smaller the initial cell-gap length $g_0$ is, the less likely the pressure in the liquid crystal is to change. Moreover, in the liquid crystal cell where structures are disposed, the initial cell-gap length $g_0$ can be regarded to be effectively reduced.

The present inventor tested a variety of liquid crystal display devices having different average cell gaps and different cell gaps. As a result, it was confirmed that generation of low-temperature bubbles was suppressed more effectively as the average cell gap and the cell gap became smaller.

Comparative Example

Hereinafter, description will be given of a liquid crystal display device as a comparative example for ease of understanding the present invention, while focusing on differences from the above embodiments.

Figure 13:
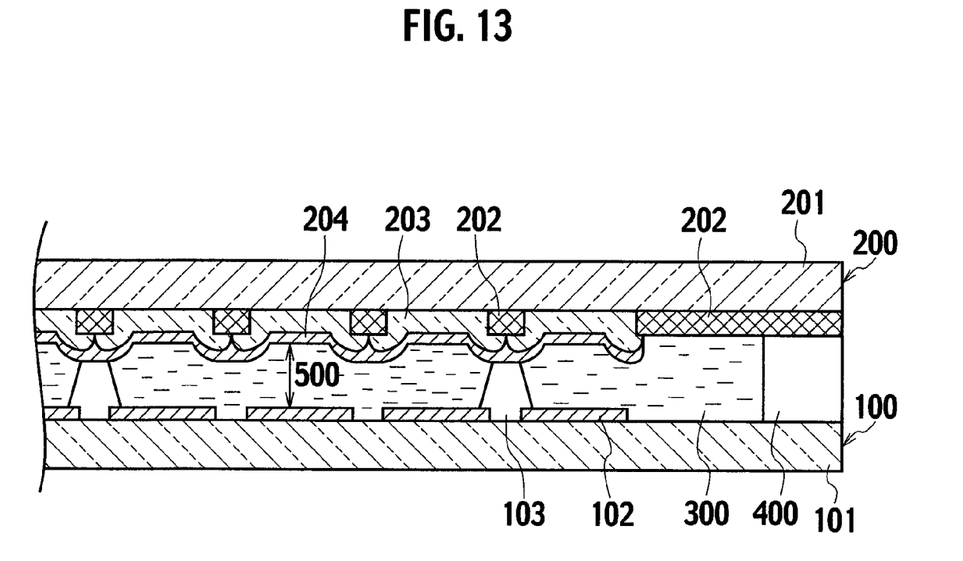
FIG. 13 is a cross-sectional view showing a liquid crystal display device as a comparative example.

As a comparative example, a liquid crystal display device with a configuration shown in a cross-sectional view of FIG. 13 may be employed. The liquid crystal display device is different from the above embodiments in that only the spacers 103 are provided between the two substrates. Accordingly, more liquid crystal is injected in the liquid crystal display device of the comparative example than in those of the above embodiments. The present inventor made the liquid crystal display device as this comparative example, and tested the effect of the liquid crystal display device. As a result, when an external impact was applied on the liquid crystal display device at an environmental temperature of 0° C., low-temperature bubbles were generated therein. At a low temperature, a contraction rate of the liquid crystal is significantly different from those of the spacers and the substrates. Thus, when an external impact is applied on this type of liquid crystal display device in a low-temperature environment, the liquid crystal cannot contract along with the contraction of the spacers and the substrates in the liquid crystal display device. As a result, low-temperature bubbles are generated in the liquid crystal display device.

By contrast, in each of the above embodiments, the members such as the protrusions 205 made of a dielectric material are provided on the opposite substrate 200. This reduces, in amount, the liquid crystal which has a low external-shock resistance while increasing, in volume, the members which have a high shock resistance, and thus can suppress generation of low-temperature bubbles in liquid crystal.

Note that in the liquid crystal display device according to each of the above embodiments, the two substrates are bonded together by a one drop fill method. The bonding method used here is not limited to this, but may be a vacuum injection method. In the vacuum injection method, an adhesive agent is disposed between the two substrates such that it can lie on the peripheral portions, excluding a liquid-crystal injection port, of the substrates. Then, after the two substrates are bonded together, a load is applied thereon so that a space between the substrates can be evacuated. More specifically, air is removed from the space through the liquid-crystal injection port so that the adhesive agent can be flattened, and thus a cell gap is formed between the substrates.

What is claimed is:

1. A liquid crystal display device, comprising:
an array substrate on which a plurality of pixel electrodes are disposed in a matrix;
an opposite substrate disposed opposite the array substrate, wherein on the opposite substrate, colored layers of color filters are formed in positions corresponding to the plurality of pixel electrodes;
a single adhesive agent seamlessly disposed between the array substrate and the opposite substrate as so to surround a display region;
a liquid crystal layer sandwiched by the array substrate and the opposite substrate in the display region; and
a wall-shaped structure disposed on a surface, adjacent to the liquid crystal layer, of a first one of the array substrate and the opposite substrate, and extending parallel to the surface of the first one of the array substrate and the opposite substrate,
wherein the wall-shaped structure is separated from a second one of the array substrate and the opposite substrate and from all solid structures attached to the second one of the array substrate and the opposite substrate, and comprises portions extending from the colored layers, the extended portions having lengths substantially the same as lengths of long sides of the colored layers.

2. The liquid crystal display device according to claim 1, wherein
a light-shielding layer for shielding light in gaps is formed between adjacent two colored layers, and
the structure is disposed on the light-shielding layer.

3. The liquid crystal display device according to claim 1, wherein a location of the structure corresponds to a location of a wire on the array substrate.

4. A liquid crystal display device, comprising:
an array substrate comprising
a plurality of pixel electrodes disposed in a matrix, and
a storage capacitor line;
an opposite substrate disposed opposite the array substrate and separated from the array substrate by a gap;
a single adhesive agent seamlessly disposed between the array substrate and the opposite substrate as so to surround a display region;
a liquid crystal layer sandwiched by the array substrate and the opposite substrate in the display region; and
a wall-shaped structure disposed on a surface, adjacent to the liquid crystal layer and on the storage capacitor line, of a first one of the array substrate and the opposite substrate, and extending parallel to the surface of the first one of the array substrate and the opposite substrate,
wherein the height of the structure is the same as a length of the gap, and a length of the structure is greater than three times the length of a short side of a pixel.

5. The liquid crystal display device according to claim 4, wherein
the gap is a first gap, and
the wall-shaped structure is provided with a second gap.

* * * * *